(12) United States Patent
Deforet et al.

(10) Patent No.: US 12,600,485 B2
(45) Date of Patent: *Apr. 14, 2026

(54) AIRCRAFT PROPULSION ASSEMBLY HAVING A JET ENGINE, A PYLON AND MEANS FOR ATTACHING THE JET ENGINE TO THE PYLON

(71) Applicant: Airbus Operations SAS, Toulouse (FR)

(72) Inventors: Thomas Deforet, Toulouse (FR);
Frédéric Journade, Toulouse (FR);
Mathieu Mahe, Toulouse (FR);
Antoine Claveyrollas, Toulouse (FR);
Mathieu Kaleta, Toulouse (FR); Eric Renaud, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 63 days.

This patent is subject to a terminal disclaimer.

(21) Appl. No.: 18/740,961

(22) Filed: Jun. 12, 2024

(65) Prior Publication Data

US 2024/0417087 A1 Dec. 19, 2024

Related U.S. Application Data

(60) Provisional application No. 63/508,107, filed on Jun. 14, 2023, provisional application No. 63/508,102, (Continued)

(30) Foreign Application Priority Data

May 29, 2024 (EP) .................................... 24178690

(51) Int. Cl.
*B64D 27/40* (2024.01)
*B64D 27/18* (2006.01)
*F02C 7/20* (2006.01)

(52) U.S. Cl.
CPC .......... *B64D 27/402* (2024.01); *B64D 27/18* (2013.01); *B64D 27/404* (2024.01); *F02C 7/20* (2013.01)

(58) Field of Classification Search
CPC ........ B64C 27/402; B64C 27/404; F02C 7/20
See application file for complete search history.

(56) References Cited

U.S. PATENT DOCUMENTS

| | | |
|---|---|---|
| 2005/0194493 A1 | 9/2005 | Marche |
| 2014/0217233 A1 | 8/2014 | Dezeustre |

(Continued)

FOREIGN PATENT DOCUMENTS

| | | | | |
|---|---|---|---|---|
| CA | 2623797 A1 * | 2/2007 | ............. | B64D 27/18 |

OTHER PUBLICATIONS

Extended European Search Report from corresponding European priority application No. 24178690.4, dated Nov. 11, 2024.

*Primary Examiner* — Timothy D Collins
*Assistant Examiner* — Terri L Filosi
(74) *Attorney, Agent, or Firm* — Greer, Burns & Crain, Ltd.

(57) ABSTRACT

A propulsion assembly for an aircraft, the propulsion assembly having a jet engine having a fan casing and a central casing around a longitudinal axis and having a vertical median plane passing through the longitudinal axis, an attachment pylon having a rigid structure that takes the form of a box that has a front wall and an upper spar extending forwardly in respect to the front wall, a front engine attachment fixed between an upper area of the central casing and a lower end of the front wall, and a complementary front engine attachment fixed between an upper area of the fan casing and a front end of the upper spar.

6 Claims, 5 Drawing Sheets

Related U.S. Application Data filed on Jun. 14, 2023, provisional application No. 63/508,104, filed on Jun. 14, 2023, provisional application No. 63/508,106, filed on Jun. 14, 2023.

(56) References Cited

U.S. PATENT DOCUMENTS

| | | |
|---|---|---|
| 2016/0221682 A1 | 8/2016 | Pautis et al. |
| 2019/0152615 A1 | 5/2019 | Combes et al. |
| 2021/0284348 A1 | 9/2021 | Whiteford |

* cited by examiner

AIRCRAFT PROPULSION ASSEMBLY HAVING A JET ENGINE, A PYLON AND MEANS FOR ATTACHING THE JET ENGINE TO THE PYLON

CROSS-REFERENCES TO RELATED APPLICATIONS

This application claims the benefit of U.S. Pat. Ser. No. 63/508,102 filed on Jun. 14, 2023, of U.S. Pat. Ser. No. 63/508,104 filed on Jun. 14, 2023, of U.S. Pat. Ser. No. 63/508,106 filed on Jun. 14, 2023, of U.S. Pat. Ser. No. 63/508,107 filed on Jun. 14, 2023, and of European Patent Application Number 24178690.4 filed on May 29, 2024, the entire disclosures of which is incorporated herein by way of reference.

TECHNICAL FIELD

The present invention relates to the general field of attaching a jet engine beneath the wing of an aircraft. It relates in particular to a propulsion assembly comprising a jet engine, in particular a turbofan, a pylon and also an attachment device intended to attach the jet engine beneath the pylon. It also relates to an aircraft equipped with such a propulsion assembly.

BACKGROUND OF THE INVENTION

A propulsion assembly of the prior art is fastened beneath a wing of an aircraft that has a jet engine and an attachment pylon via which the jet engine is fastened beneath the wing. Generally, the attachment pylon has a rigid structure, which is also called the primary structure, bearing first fastening elements intended to attach the jet engine.

These first fastening elements are formed of a front engine attachment, a rear engine attachment, and a device for reacting the thrust forces generated by the jet engine.

The attachment pylon also has second fastening elements allowing the attachment pylon to be fastened to the wing.

The jet engine has, at the front, a fan casing surrounding an annular fan duct and, towards the rear, a central casing of smaller size, enclosing the core of the jet engine.

The front engine attachment is interposed between a front end of the rigid structure and a front upper part of the central casing, and the rear engine attachment is interposed between the rigid structure and a rear upper part of the central casing. The device for reacting the thrust forces generated by the jet engine comprises two rods disposed on either side of a median vertical plane of the jet engine and articulated, on the one hand, on the central casing, and, on the other hand, on a single spreader fastened to the rigid structure. The device for reacting the thrust forces that is formed by the two rods and the spreader is designed to react all or most of the forces oriented in the longitudinal axis X of the jet engine.

The front engine attachment has, on either side of the pylon, a rod and each rod is fastened in an articulated manner to the pylon by one of its ends and is fastened in an articulated manner to the central casing by the other of its ends. One of the rods is fastened via two connection points to the pylon and via one connection point to the central casing, and the second rod is fastened via a connection point to the pylon and via a connection point to the central casing.

Although such a structure is satisfactory, it is desirable to find an arrangement that allows a space saving in order to reduce the weight and improve the aerodynamism of the aircraft.

SUMMARY OF THE INVENTION

An object of the present invention is to propose a propulsion assembly comprising a jet engine, a pylon and an attachment device intended to attach the jet engine beneath the pylon.

To that end, there is proposed a propulsion assembly for an aircraft, said propulsion assembly having:
- a jet engine having a fan casing and a central casing around a longitudinal axis and having a vertical median plane passing through the longitudinal axis,
- an attachment pylon having a rigid structure that takes the form of a box that has a front wall and an upper spar extending forwardly in respect to the front wall,
- a front engine attachment fixed between an upper area of the central casing and a lower end of the front wall, and
- a complementary front engine attachment fixed between an upper area of the fan casing and a front end of the upper spar.

With such an arrangement, the sizes of the attachments are reduced.

Advantageously, the propulsion assembly comprises a main rod fixed between the upper spar and the front wall.

Advantageously, the front engine attachment comprises two fitting assemblies, each one comprising, at the vertical median plane, a first articulation point with the lower end of the front wall, and on each side of the vertical median plane, a second articulation point with the upper area of the central casing.

Advantageously, each fitting assembly comprises at the vertical median plane, a waiting fail safe articulation with the upper area of the central casing.

Advantageously, each fitting assembly comprises two plates fixed together.

Advantageously, the complementary front engine attachment comprises a lever mounted articulated on the front end of upper spar at the vertical median plane and on each side of the vertical median plane, the lever comprises an end mounted articulated on the upper area of the fan casing, each articulation being at least a rotation around an axis parallel to the longitudinal axis.

Advantageously, the complementary front engine attachment comprises a plate assembly mounted articulated on the front end of the upper spar at the vertical median plane and on each side of the vertical median plane, the plate assembly comprises an end mounted articulated on the upper area of the fan casing, each articulation being at least a rotation around an axis parallel to a vertical axis.

The invention also proposes an aircraft having a wing and a propulsion assembly according to one of the preceding variants, wherein the rigid structure is fastened beneath the wing.

BRIEF DESCRIPTION OF THE DRAWINGS

The abovementioned features of the invention, along with others, will become more clearly apparent upon reading the following description of one exemplary embodiment, said description being given with reference to the appended drawings, in which.

DETAILED DESCRIPTION OF EMBODIMENTS

Figure 1:
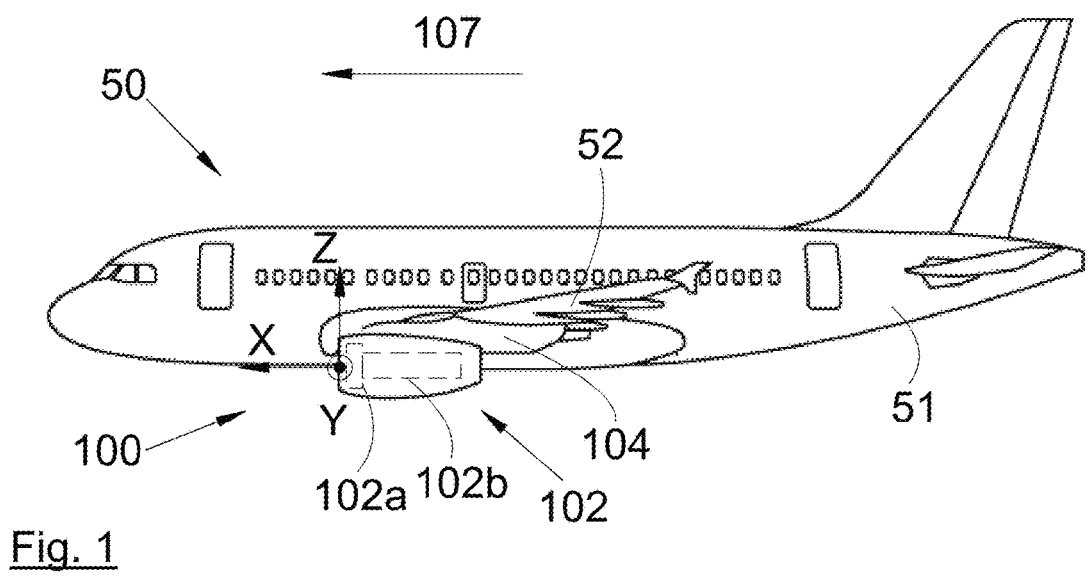
FIG. 1 is a side view of an aircraft according to the invention.

FIG. 1 shows an aircraft 50 that has a fuselage 51 and a wing 52 on each side of the fuselage 51. At least one propulsion assembly 100 is fastened beneath each wing 52 and it comprises a jet engine 102 and an attachment pylon 104.

By convention, X denotes the longitudinal axis of the propulsion assembly 100 corresponding to a longitudinal axis X of the jet engine 102. Moreover, Y denotes the transverse axis of the propulsion assembly 100 corresponding to a transverse axis of the jet engine 102, this axis being horizontal when the aircraft is on the ground, and Z denotes the vertical axis or vertical height of the propulsion assembly 100 corresponding to a vertical axis of the jet engine 102, this axis being vertical when the aircraft is on the ground, these three axis X, Y and Z being mutually orthogonal.

Moreover, the terms "front" and "rear" are to be considered relative to a direction of forward movement of the aircraft when the jet engine 102 is in operation, this direction being schematically shown by the arrow 107. The jet engine 102 has also a vertical median plane P (XZ) passing through the longitudinal axis X and the vertical axis Z.

The jet engine 102 has at the front, a fan casing 102*a* surrounding an annular fan duct in which a fan rotates and at the rear of the fan casing 102*a*, a central casing 102*b* of smaller size, enclosing the core of the jet engine 102. The fan casing 102*a* and the central casing 102*b* are around the longitudinal axis X.

The propulsion assembly 100 has also a nacelle inside which the jet engine 102 is installed.

Figure 2:
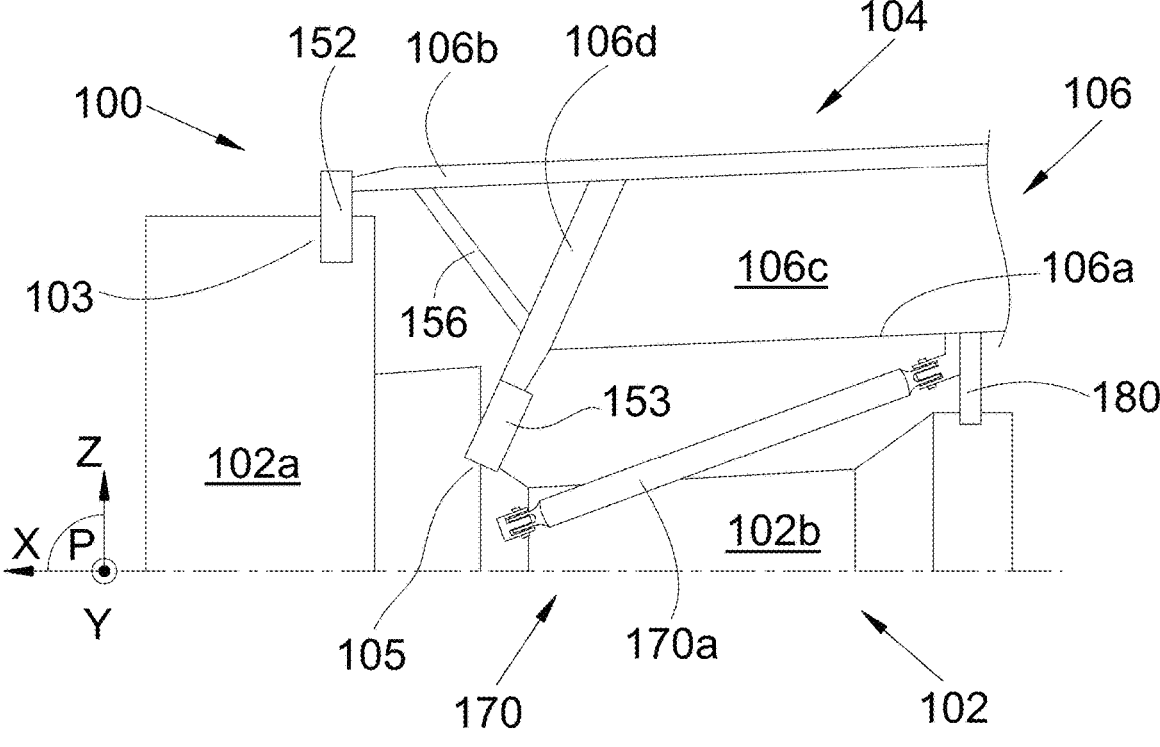
FIG. 2 is a schematic view of a propulsion assembly according to the invention.

FIG. 2 shows the propulsion assembly 100 with the jet engine 102 and the attachment pylon 104 via which the jet engine 102 is fastened to the wing 52. The attachment pylon 104 is shown here by its rigid structure 106, which is also called the primary structure and which is fastened beneath the wing 52.

The rigid structure 106 extends along the longitudinal axis X between a front end and a rear end and takes the form of a box that has a lower spar 106*a*, an upper spar 106*b*, two lateral walls 106*c* and a frontal wall 106*d* which are fixed together to realize the rigid structure 106. The front wall 106*d* is oriented towards the front of the aircraft 50. A lateral wall 106*c* is arranged on each side of the vertical median plane P. The upper spar 106*b* is above the lateral walls 106*c* and the lower spar 106*a* is beneath the lateral walls 106*c*.

The upper spar 106*b* extends forwardly in respect to the front wall 106*d*, it means that the upper spar 106*b* has a front end that is far from the front wall 106*d* in the forward direction F.

In the present embodiment, the propulsion assembly 100 comprises a reaction device 170 for reacting the thrust forces generated by the jet engine 102. Here the reaction device 170 comprises two reaction rods 170*a* disposed on either side of the median plane P and articulated, on the one hand, at the front, on the central casing 102*b*, and, on the other hand, at the rear, on the rigid structure 106 for example on the lower spar 106*a* thanks to appropriate fittings that are not described in details because they are not a part of the invention and a man skilled in the art will be able to implement the fittings known from the prior art.

In the present embodiment, the propulsion assembly 100 comprises also a rear attachment 180 between the rigid structure 106, in this case the lower spar 106*a*, and a rear upper part of the central casing 102*b*. The rear attachment 180 is not described in detail because it is not a part of the invention and a man skilled in the art will be able to implement it from the prior art.

In the invention, the propulsion assembly 100 comprises a front engine attachment 153 fixed between an upper area 105 of the central casing 102*b* and a lower end of the front wall 106*d*.

At the same time, the propulsion assembly 100 comprises a complementary front engine attachment 152 which is fixed between an upper area 103 of the fan casing 102*a* and the front end of the upper spar 106*b*.

With such arrangement, the sizes of the attachments are reduced and allows an aerodynamic optimization by reducing the size of the fairing of the nacelle.

According to a specific arrangement of the invention, the front engine attachment 153 reacts to the lateral loads (parallel to the lateral axis Y) and to vertical loads (parallel to the vertical axis Z) and the complementary front engine attachment 152 reacts to the lateral loads (parallel to the lateral axis Y) only.

In addition, the axial moment Mx is sustained by the front engine attachment 153 and the complementary front engine attachment 152 thanks to the lateral loads acting on the fan casing 102*a* and the lateral loads acting on the central casing 102*b*. The load transfer from the jet engine 102 to the attachment pylon 104 through this engine mount concept is isostatic.

In the present embodiment, in order to reinforce the upper spar 106*b*, the propulsion assembly 100 comprises a main rod 156 fixed between the upper spar 106*b* and the front wall 106*d*. Each end of the main rod 156 is mounted in an articulated manner respectively to the upper spar 106*b* and to the front wall 106*d*.

In an example of the invention, each end of the main rod 156 is fixed through clevis. For example, the end of the main rod 156 is a male clevis inserted in a female clevis 156*a* (FIG. 7) fixed to the upper spar 106*b* or the front wall 106*d* and maintained by an axis perpendicular to the vertical median plane P.

Figure 3:
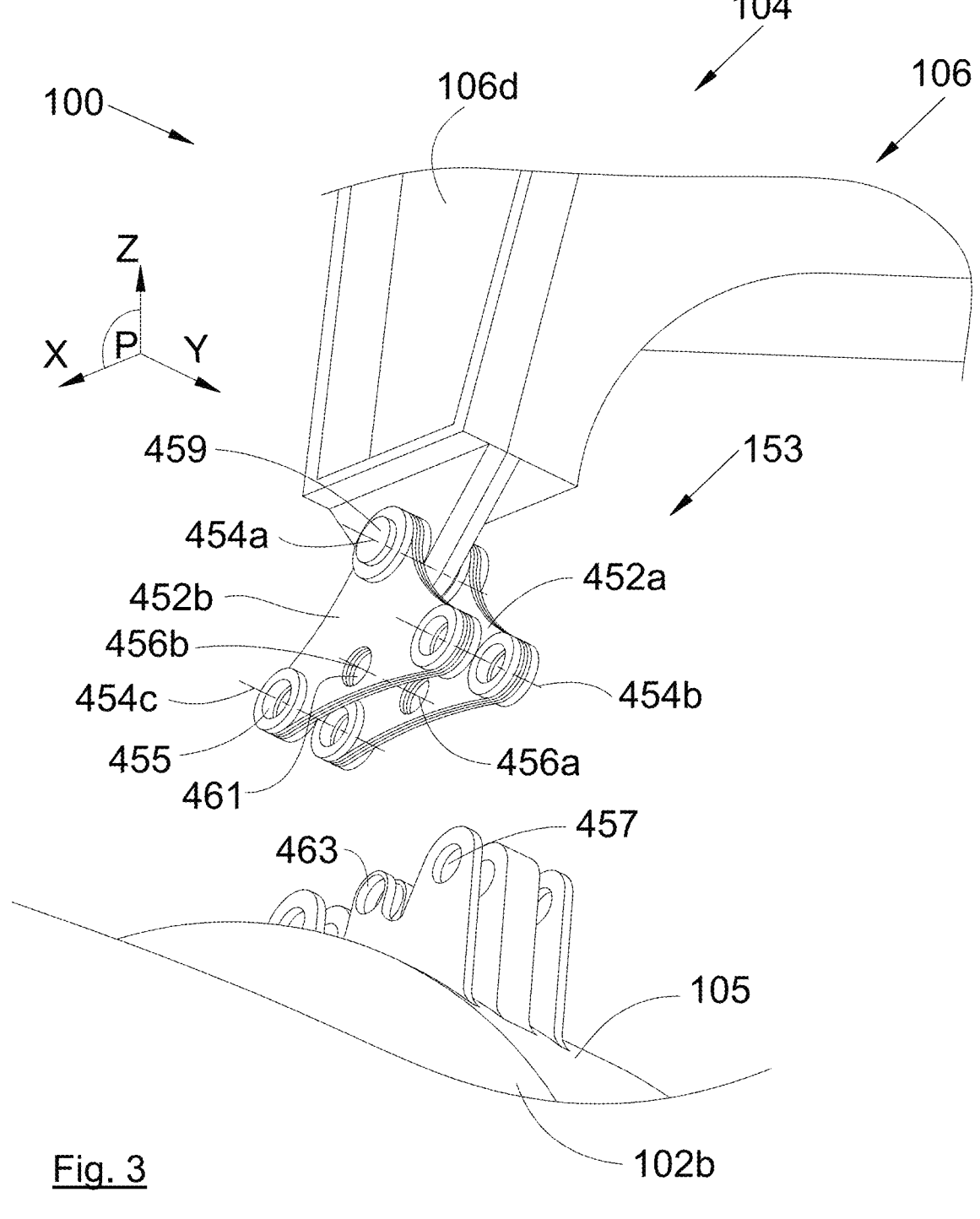
FIG. 3 is a perspective view of a font engine attachment according to the invention.

FIG. 3 shows the front engine attachment 153 according to the invention.

The front engine attachment 153 comprises two fitting assemblies 452*a-b*, each one comprising, at the vertical median plane P, a first articulation point 454*a* to realize an articulation with the lower end of the front wall 106*d*, and on each side of the vertical median plane P, a second articulation point 454*b-c* to realize an articulation with the upper area 105 of the central casing 102*b*.

Each fitting assembly 452*a-b* is globally in a plane perpendicular to the longitudinal axis X and each articulation point 454*a-c* takes the form of a pivot link, the axis of rotation of which is globally parallel to the longitudinal axis X. Each articulation 454*a-c* of one fitting assembly 452*a-b* is coaxial with one articulation 454*a-c* of the other fitting assembly 452*a-b*.

To this end, each articulation 454*a-c* is realized by the combination of a first articulation hole 455 passing through the corresponding fitting assembly 452*a-b* and a second articulation hole 457 passing through the lower end of the front wall 106*d* or the upper area 105 of the central casing 102*b*.

In position, a first articulation hole 455 of one fitting assembly 452*a-b* is aligned with a first articulation hole 455 of the other fitting assembly 452*b-a* and a second articulation hole 457 of the lower end of the front wall 106*d* or of the upper area 105 of the central casing 102*b*.

The propulsion assembly 100 comprises also for each second articulation hole 457, an articulation axis 459 which is inserted in said second articulation hole 457 and in the corresponding first articulation holes 455 of the two fitting assemblies 452*a-b*. The axis of each articulation axis 459 is globally parallel to the longitudinal axis X.

In the present embodiment, each fitting assembly 452*a-b* takes the form of a triangle and a fitting assembly 452*a-b* is arranged on each side of the lower end of the front wall 106*d*.

For safety reasons, each fitting assembly 452*a-b* comprises two plates fixed together and for each articulation 454*a-c*, each plate comprises a first articulation hole 455.

For safety reasons, each fitting assembly 452*a-b* comprises at the vertical median plane P, a waiting fail safe articulation 456*a-b* to realize a safety articulation with the upper area 105 of the central casing 102*b*, each safety articulation takes the form of a pivot link, the axis of rotation of which is globally parallel to the longitudinal axis X. The safety articulation 456*a* of one fitting assembly 452*a* is coaxial with the safety articulation 456*b* of the other fitting assembly 452*b*.

To this end, each safety articulation 456*a-b* is realized by the combination of a first safety hole 461 passing through the corresponding fitting assembly 452*a-b* and a second safety hole 463 passing through the upper area 105 of the central casing 102*b*. In position, the safety holes 461 are aligned one with the other and with the corresponding second safety holes 463 of the upper area 105 of the central casing 102*b*.

The propulsion assembly 100 comprises also a safety axis which is inserted in the corresponding second safety holes 463 and in the first safety holes 461 of the fitting assemblies 452*a-b*. The axis of each safety axis is globally parallel to the longitudinal axis X.

In case of each fitting assembly 452*a-b* is made of two plates, each plate comprises a first safety hole 461.

The waiting fail safe articulation 456*a-b* are waiting fail safe elements. It means that, in normal use, a primary force path is defined through the first articulation points 454*a* and the second articulation points 454*b-c* and the loads are transferred through this primary force path. In case of failure of the primary force path, the safety articulation 456*a-b*, it means the waiting fail safe elements are solicited.

To realize the waiting fail safe articulation, the diameter of each safety hole 461 is bigger than the diameter of the safety axis. Thus, in normal operation there is no contact between the fitting assemblies 452*a-b* and the safety axis, and in case of failure, the fan casing 102*a* would move and the fitting assemblies 452*a-b* would then come into contact with the safety axis.

Figure 4:
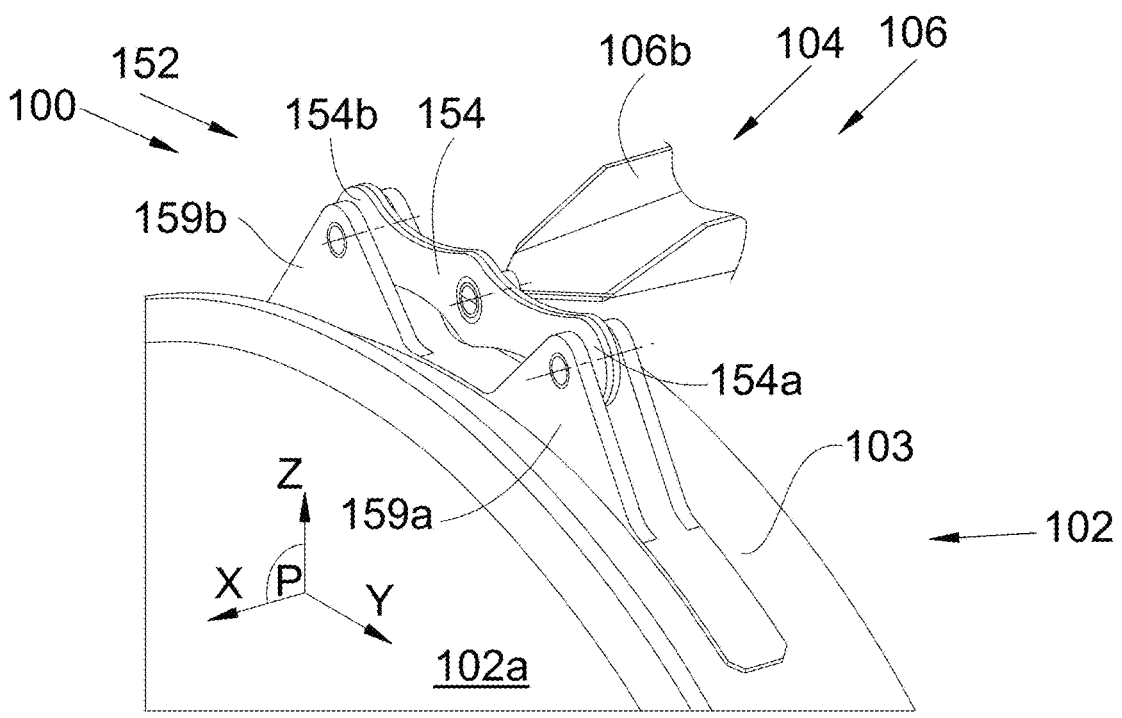
FIG. 4 is a perspective view of an example of a complementary front engine attachment used in the propulsion assembly according to the invention.
Figure 5:
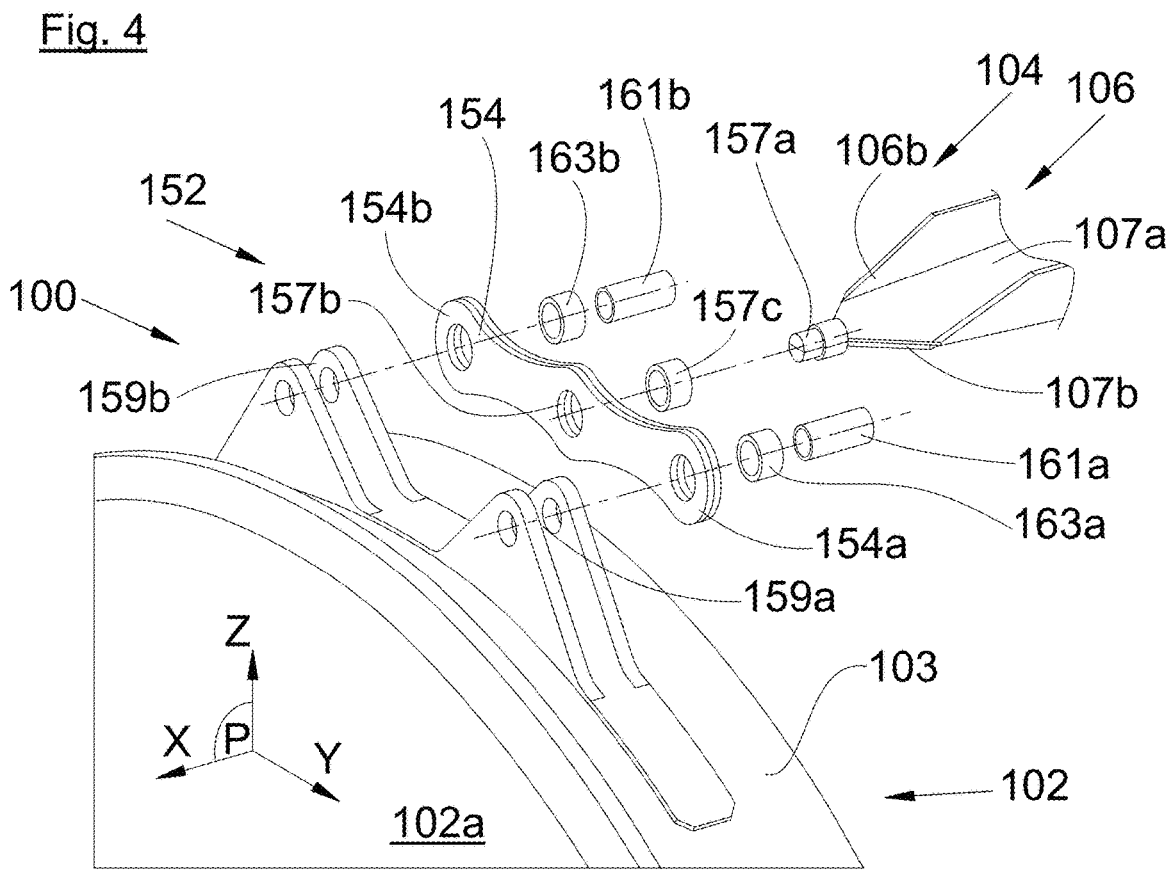
FIG. 5 is an exploded view of the complementary front engine attachment of FIG. 4.

FIGS. 4 and 5 show a complementary front engine attachment 152 used in the invention.

The complementary front engine attachment 152 comprises a lever 154 which is mounted articulated on the front end of the upper spar 106*b* at the vertical median plane P. To this end, the front end of the upper spar 106*b* comprises a front cylinder 157*a*, the axis of which is in the vertical median plane P and parallel to the longitudinal axis X and the lever 157 comprises a front hole 157*b* in which the front cylinder 157*a* is inserted in an articulated manner.

The lever 154 is at least mobile in rotation around the front cylinder 157*a*, it means around an axis parallel to the longitudinal axis X.

In the present embodiment, the articulation of the lever 157 on the front cylinder 157*a* is a ball joint link. To this end, a spherical bearing 157*c* is introduced in the front hole 157*b* between the front cylinder 157*a* and the lever 154. The main articulation is a rotation around the front cylinder 157*a* with small rotations about other axis.

On each side of the vertical median plane P, the lever 154 comprises an end 154*a-b* which is mounted articulated on the upper area 103 of the fan casing 102*a*. These two ends 154*a-b* are symmetrical in respect to the vertical median plane P.

To this end, for each end 154*a-b* of the lever 154, a female clevis 159*a-b* is fixed to the upper area 103 of the fan casing 102*a* and said end 154*a-b* of the lever 154 is a male clevis mounted articulated in said female clevis 159*a-b* and maintained by an articulation axis 161*a-b* inserted in an articulation hole of the end 154*a-b* and articulation holes of the female clevis 159*a-b* and this articulation axis 161*a-b* is parallel to the longitudinal axis X.

As previously, each end 154*a-b* is at least mobile in rotation around the corresponding.

In the present embodiment, the articulation of each end 154*a-b* of the lever 157 on the upper area 103 of the fan casing 102*a* is a ball joint link. To this end, a spherical bearing 163*a-b* is introduced in the articulation hole of each end 154*a-b*, between the lever 157 and the associated articulation axis 161*a-b*. The main articulation is a rotation around an axis parallel to the longitudinal axis X with small rotations about other axis.

For safety reasons, the upper spar 106*b* is made of two superimposed plates 107*a-b* which are fixed together and the front cylinder 157*a* is made of two half cylinders, one being integral with one plates 107*a* and another being integral with the other plate 107*b*.

In the same manner, the lever 154 is made of two plates which are fixed together, each plate comprising a front hole 157*b* for accommodating the front cylinder 157*a* and each end of each plate comprising an articulation hole for accommodating an articulation axis 161*a-b*.

For safety reason, the articulation of one of the two ends 154*a-b* is a waiting fail safe articulation. It means that, in normal use, a primary force path is defined through one of the ends 154*a-b* of the lever 154 and the loads are transferred through this primary force path. In case of failure of the primary force path, the second end 154*a-b* of the lever 154, it means the waiting fail safe articulation is solicited. To realize the waiting fail safe articulation, the diameter of the concerned articulation axis 161*a-b* is smaller than the diameter of the hole of the end 154*a-b* of the lever 154. Thus, in normal operation there is no contact between the articulation axis 161*a-b* and the hole of the end 154*a-b*, and in case of failure, the fan casing 102*a* would move and the articulation axis 161*a-b* would then come into contact with the hole of the end 154*a-b*.

Figure 6:
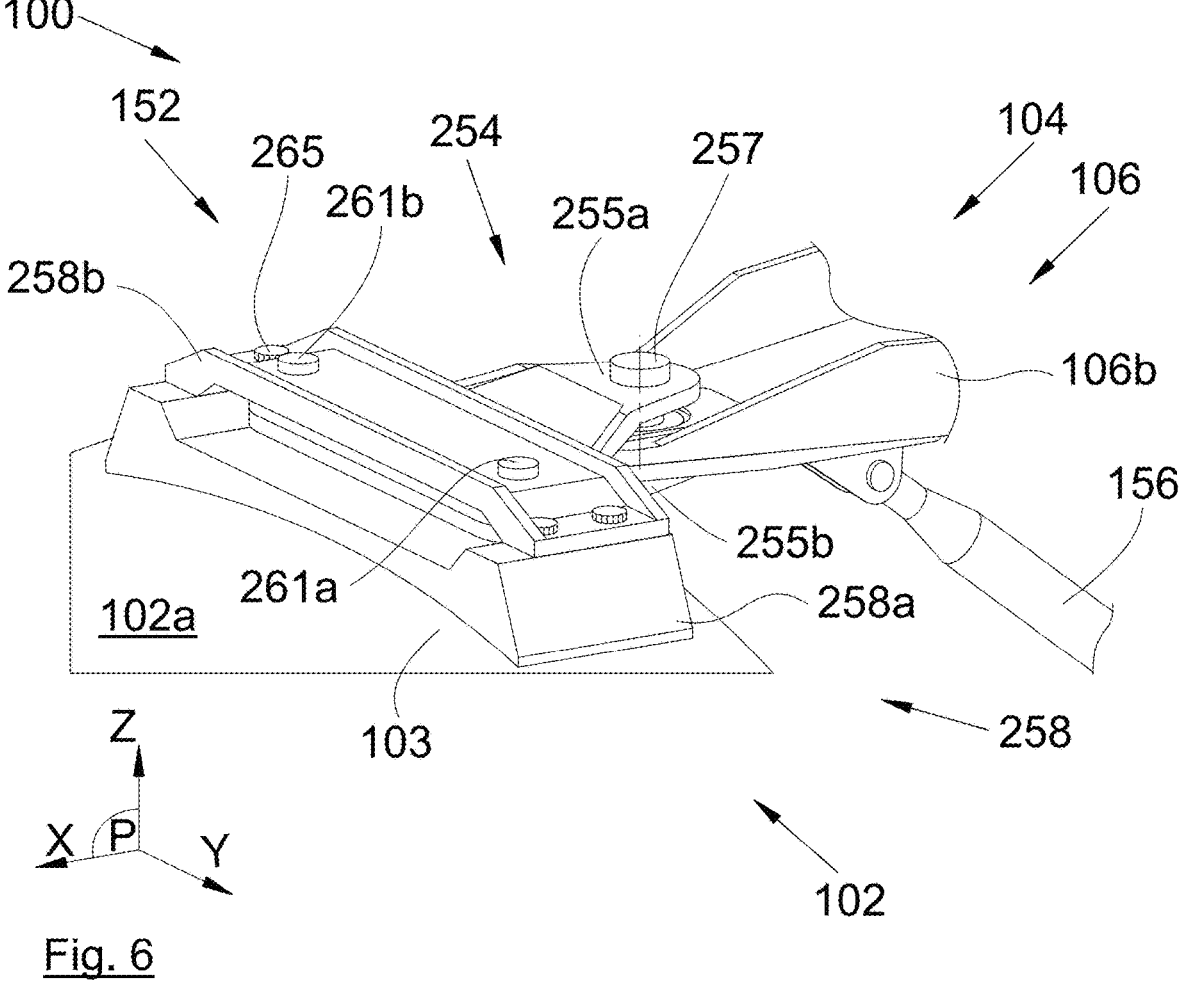
FIG. 6 is a perspective view of an example of another complementary front engine attachment used in the propulsion assembly according to the invention.
Figure 7:
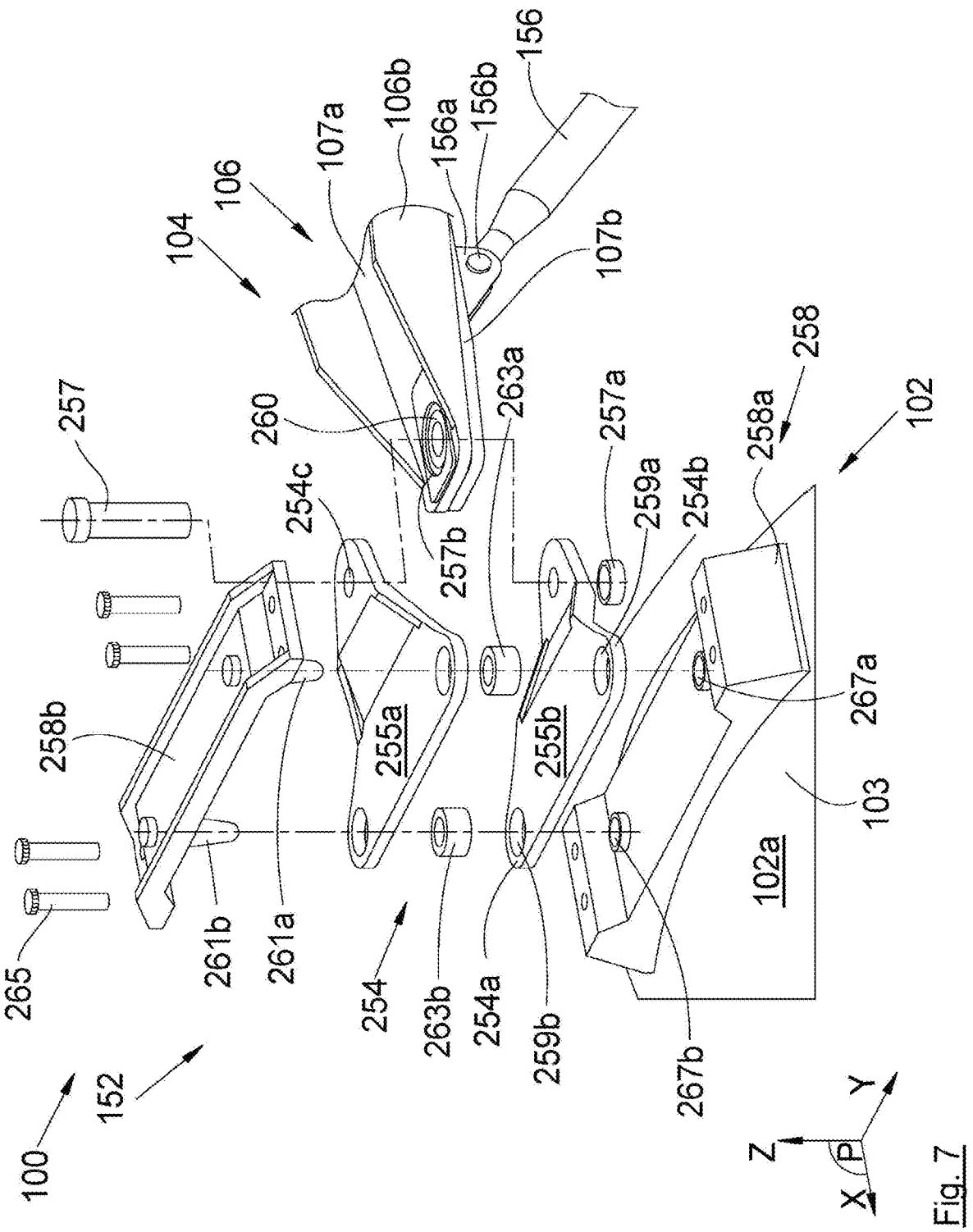
FIG. 7 is an exploded view of the complementary front engine attachment of FIG. 6.

FIGS. 6 and 7 show another complementary front engine attachment 152 used in the invention.

The complementary front engine attachment 152 comprises a plate assembly 254 which is mounted articulated on the front end of the upper spar 106*b* at the vertical median plane P. To this end, the plate assembly 254 comprises at the vertical median plane P, a central hole 254*c* through which a central axis 257 is inserted and fixed to the front end of the upper spar 106*b*. The central axis 257 is parallel to the vertical axis Z and is fixed in a passing hole 257*b* of the front end of the upper spar 106*b*. The fixation of the central axis 257 is realized here by setting a nut 257*a* screwed on the central axis 257 and taking the plate assembly 254 and the upper spar 106*b* in sandwich.

The plate assembly 254 is then at least mobile in rotation around an articulation axis parallel to the vertical axis Z and in respect to the upper spar 106*b*. In the present embodiment, the articulation of the plate assembly 254 on the upper spar 106*b* is a ball joint link. To this end, a spherical bearing 260 is introduced in the passing hole 257*b* between the central axis 257 and the upper spar 106*b*. The main articulation is a rotation around a vertical axis parallel to the vertical axis Z with small rotations about other axis.

In addition, on each side of the vertical median plane P, the plate assembly 254 comprises an end 254*a-b* mounted articulated on the upper area 103 of the fan casing 102*a*. These two ends 254*a-b* are symmetrical in respect to the vertical median plane P. The articulation of each end 254*a-b* with the upper area 103 of the fan casing 102*a* is at least a rotation around an end axis parallel to the vertical axis Z. To this end, each end 254*a-b* presents an articulation hole 259*a-b* and the propulsion assembly 100 comprises for each articulation hole 259*a-b*, an articulation axis 261*a-b* fixed to the upper area 103 of the fan casing 102*a*, wherein the articulation axis 261*a-b* is inserted in said articulation hole 259*a-b*. Each articulation axis 261*a-b* has its axis parallel to the vertical axis Z.

In the present embodiment, the articulation of the plate assembly 254 on the upper area 103 of the fan casing 102*a* is a ball joint link. To this end, a spherical bearing 263*a-b* is introduced in each articulation hole 259*a-b* between the articulation axis 261*a-b* and plate assembly 254 the plate assembly 254. The main articulation is a rotation around a vertical axis parallel to the vertical axis Z with small rotations about other axis.

For safety reasons, the plate assembly 254 comprises two plates 255*a-b* which are parallel to each other and wherein each plates 255*a-b* is mounted articulated on the upper spar 106*b* and on the upper area 103 of the fan casing 102*a*.

To this end, each plate 255*a-b* presents at the vertical median plane P a central hole 254*c* and on each side of the vertical median plane P, an articulation hole 259*a-b*. The central hole 254*c* of the two plates 255*a-b* are coaxial, and on each end 254*a-b*, the articulation holes 259*a-b* of the two plates 255*a-b* are coaxial.

The central axis 257 is inserted in the two central holes 254*c* and each articulation axis 261*a-b* is inserted in the two corresponding articulation holes 259*a-b*.

In the present embodiment, the propulsion assembly 100 comprises a vice 258 with a first jaw 258*a* which is fixed to the upper area 103 of the fan casing 102*a* and a second jaw 258*b* which is fixed to the first jaw 258*a*, here by fixation screws 265.

Each articulation axis 261*a-b* is integral with the second jaw 258*b* and the free end of each articulation axis 261*a-b* is inserted in an insertion hole 267*a-b* realized for this purpose in the first jaw 258*a*, in order to ensure the rigidity of said articulation axis 261*a-b*.

In the present embodiment, the plate assembly 254, it means here, the two plates 255*a-b*, are installed and rigidly constrained between the two jaws 258*a-b* by screwing of the fixation screws 265.

In addition, the upper spar 106*b* is installed between the two plates 255*a-b*. It means that the central axis 257 crosses successively the upper plate 255*a*, the upper spar 106*b* and the lower plate 255*b*.

For safety reasons, the upper spar 106*b* is made of two superimposed plates 107*a-b* which are fixed together and the spherical bearing 260 is here arranged between the superimposed plates 107*a-b*, where each comprises a passing hole 257*b* for the passage of the central axis 257.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A propulsion assembly for an aircraft, said propulsion assembly comprising:
   a jet engine having a fan casing and a central casing around a longitudinal axis and having a vertical median plane passing through the longitudinal axis,
   an attachment pylon having a rigid structure that takes a form of a box that has a front wall and an upper spar extending forwardly in respect to the front wall,
   a front engine attachment fixed between an upper area of the central casing and a lower end of the front wall, and
   a complementary front engine attachment fixed between an upper area of the fan casing and a front end of the upper spar,
   wherein the front engine attachment comprises two fitting assemblies, each one comprising, at the vertical median plane, a first articulation point with the lower end of the front wall, and on opposite sides of the vertical median plane, a second articulation point with the upper area of the central casing,
   wherein the complementary front engine attachment comprises a plate assembly mounted in a third articulated manner on the front end of the upper spar at the vertical median plane and on opposite sides of the vertical median plane, the plate assembly comprises a first end mounted in a fourth articulated manner on the upper area of the fan casing, the third articulated manner and the fourth articulated manner each providing at least a rotation around an axis parallel to a vertical axis.

2. The propulsion assembly according to claim 1, further comprising:
   a main rod fixed between the upper spar and the front wall.

3. The propulsion assembly according to claim 1, wherein each fitting assembly comprises at the vertical median plane, a waiting fail safe articulation with the upper area of the central casing.

4. The propulsion assembly according to claim 1, wherein each fitting assembly comprises two plates fixed together.

5. The propulsion assembly according to claim 1, wherein the complementary front engine attachment comprises a lever movably mounted on the front end of upper spar at the vertical median plane and first and second ends of the lever are movably mounted to the upper area of the fan casing on opposite sides of the vertical median plane, the lever movably mounted at the vertical median plane and the first and second ends movably mounted on opposite sides of the vertical median plane each providing at least a rotation around an axis parallel to the longitudinal axis.

6. An aircraft comprising:

a wing, and the propulsion assembly according to claim 1, wherein the rigid structure is fastened beneath the wing.

* * * * *